(12) United States Patent
Yang (10) Patent No.: US 6,907,060 B2
(45) Date of Patent: Jun. 14, 2005

(54) METHOD FOR GENERATING OVSF CODES IN CDMA MULTI-RATE SYSTEM

(75) Inventor: Guu-Chang Yang, Taichung (TW)

(73) Assignee: Accton Technology Corporation, Hsinchu (TW)

(*) Notice: Subject to any disclaimer, the term of this patent is extended or adjusted under 35 U.S.C. 154(b) by 900 days.

(21) Appl. No.: 09/824,032

(22) Filed: Apr. 3, 2001

(65) Prior Publication Data

US 2002/0171568 A1 Nov. 21, 2002

(51) Int. Cl.$^7$ ................................................ H04B 1/69
(52) U.S. Cl. ...................................... 375/141; 375/146
(58) Field of Search .......................................... 375/146

(56) References Cited

U.S. PATENT DOCUMENTS 5,751,761 A * 5/1998 Gilhousen ................... 375/146

OTHER PUBLICATIONS

Dinan, E., Jabbari, B.; Spreading Codes for Direct Sequence CDMA and wideband CDMA Cellular Networks; Sep. 1998; IEEE Communications Magazine; vol. 36, No. 9; pp. 48–54.*

* cited by examiner

*Primary Examiner*—Stephen Chin
*Assistant Examiner*—Sudhanshu C. Pathak
(74) *Attorney, Agent, or Firm*—Rosenberg, Klein & Lee (57) ABSTRACT

In this invention, a new tree-structured generation method for obtaining orthogonal variable spreading factor (OVSF) codes that preserve orthogonality between different rates and spreading factors (SF) based on Gray code labels in a CDMA system is presented. Each OVSF code is uniquely associated with a Gray code label. An efficient method for deciding if the code is a mother code or children code of the other code without searching an entire code tree is proposed. Furthermore, by taking advantage of the Gray code labeling, each OVSF code can be generated directly from a generating matrix instead of being generated recursively using a tree structure. An OVSF code reassignment method with Gray code labeling is also given.

11 Claims, 5 Drawing Sheets

| Decimal | Input Binary Code | | | | Output Gray Code | | | |
|---|---|---|---|---|---|---|---|---|
| | $X_3$ | $X_2$ | $X_1$ | $X_0$ | $y_3$ | $y_2$ | $y_1$ | $y_0$ |
| 0  | 0 | 0 | 0 | 0 | 0 | 0 | 0 | 0 |
| 1  | 0 | 0 | 0 | 1 | 0 | 0 | 0 | 1 |
| 2  | 0 | 0 | 1 | 0 | 0 | 0 | 1 | 1 |
| 3  | 0 | 0 | 1 | 1 | 0 | 0 | 1 | 0 |
| 4  | 0 | 1 | 0 | 0 | 0 | 1 | 1 | 0 |
| 5  | 0 | 1 | 0 | 1 | 0 | 1 | 1 | 1 |
| 6  | 0 | 1 | 1 | 0 | 0 | 1 | 0 | 1 |
| 7  | 0 | 1 | 1 | 1 | 0 | 1 | 0 | 0 |
| 8  | 1 | 0 | 0 | 0 | 1 | 1 | 0 | 0 |
| 9  | 1 | 0 | 0 | 1 | 1 | 1 | 0 | 1 |
| 10 | 1 | 0 | 1 | 0 | 1 | 1 | 1 | 1 |
| 11 | 1 | 0 | 1 | 1 | 1 | 1 | 1 | 0 |
| 12 | 1 | 1 | 0 | 0 | 1 | 0 | 1 | 0 |
| 13 | 1 | 1 | 0 | 1 | 1 | 0 | 1 | 1 |
| 14 | 1 | 1 | 1 | 0 | 1 | 0 | 0 | 1 |
| 15 | 1 | 1 | 1 | 1 | 1 | 0 | 0 | 0 |

TABLE 1

METHOD FOR GENERATING OVSF CODES IN CDMA MULTI-RATE SYSTEM

FIELD OF THE INVENTION

The present invention relates to a method for generating orthogonal variable spreading factor (OVSF) codes, and especially to a new tree-structured generation method for obtaining OVSF codes that preserve orthogonality between different rates and spreading factors (SFs) based on Gray code labels.

BACKGROUND OF THE INVENTION

The emergence of new services and the continuous increase in demand for all types of wireless services are raising the demand for large increase in capacity, data rates, and multimedia services. With the introduction of the third-generation system IMT-2000, the second-generation mobile system capabilities (voice and low-rate data) are extended, adding multimedia capabilities to second-generation platforms such as support for high bit rates and introduction of packet data (refer to [1] ETSI, "The ETSI UMTS Terrestrial Radio Access (UTRA) ITU-R RTT Candidate Submission," June 1998; [2] ARIB, "Japan's Proposal for Candidate Radio Transmission Technology on IMT-2000: W-CDMA," June 1998; and [3] TIA, "The cdma2000ITU-R RTT Candidate Submission," June 1998). Especially, the third-generation system provides a flexible support of multi-rate services. Multi-rate design means multiplexing different connections with different qualities of services (QoS) requirements in a flexible and spectrum-efficient way.

Variable-length spreading and multi-code techniques are two major approaches used in IMT-2000 with code-division multiple access (CDMA) to support a variety of data services from low to high bit rates (refer to E. Dinan and B. Jabbari, "Spreading Codes for Direct Sequence CDMA and Wideband CDMA Cellular Networks," IEEE Commun. Mag., vol. 36, no. 9, pp. 48–54, September 1998; and 3GPP TR 25.922 v. 0.5.0, "Radio Resource Management Strategies," October 1999). The variable-length spreading CDMA employs multiple spreading factors for multiple-rate transmission, while multi-code CDMA allocates multiple codes to high data rate services. In order to provide mutual orthogonality between the users of the same cell while maintaining mutual randomness between the users of different cells, a flexible system operation mode, so called "multiple spreading" or "two-layer spreading", is adopted in IMT-2000 with CDMA (refer to E. Dinan and B. Jabbari, "Spreading Codes for Direct Sequence CDMA and Wideband CDMA Cellular Networks," IEEE Commun. Mag., vol. 36, no. 9, pp. 48–54, September 1998; and 3GPP TR 25.922 v. 0.5.0, "Radio Resource Management Strategies," October 1999). Multiple spreading consists of two operations. The first operation is a channelization operation, which transforms every data symbol into a number of chips. The number of chips per data symbol is called the spreading factor. Orthogonal variable spreading factor codes are employed as channelization codes to preserve the orthogonality between the different downlink channels. The second operation is a scrambling operation, where a scrambling code is applied to a spread signal. Gold codes or pseudo random sequences with a limited cross-correlation are employed as scrambling codes to preserve the randomness between the users of different cells.

In IMT-2000, a spreaded bandwidth is the same for all users. Therefore, multiple-rate transmission needs multiple SFs or multi-codes. However, OVSF codes are valuable resources in the system. For a given SF, the number of the available codes is limited. Thus, an efficient code allocation strategy to support different data rates becomes ever important. A proper code allocation algorithm is to support as many users as possible with less complexity. For example, a random assignment of codes to low data rate users with large SFs may preclude the assignment of the codes with small SFs (see K. Gilhousen, "System and Method for Orthogonal Spread Spectrum Sequence Generation in Variable Data Rate Systems," U.S. Pat. No. 5,751,761, issued in May 1998). Let utilization be defined as the ratio of an assigned bandwidth to an overall bandwidth. A combination of multi-code and variable-length spreading can provide a higher utilization. However, the use of multi-code technique will have an impact on the mobile receiver's complexity. Hence, the number of codes to support the multi-code capability in each mobile station is limited. Therefore, "code reassignment" among the active users seems unavoidable in order to improve the system utilization. The OVSF codes that preserve the orthogonality between different rates and SFs are presented in the above listed papers of E. Dinan and B. Jabbari; K. Gilhousen, and F. Adachi, M. Sawahashi, and K. Okawa and paper of 3GPP TR 25.922 v. 0.5.0, "Radio Resource Management Strategies," October 1999. Each layer in the code tree defines channelization codes of length SF. Any two codes at the same layers are orthogonal and any two codes at the different layers are orthogonal except for the case that one of the two codes is on the path from the other code to the root of the tree or in the sub-tree below the other code. However, the code tree is huge as any of the channelization codes can use SF from 4 to 256 in IMT-2000. An efficient method to allocate a code to a user according to his requested data rate is needed. Furthermore, an efficient method for generating the required OVSF codes instead of maintaining the whole code tree in the memory of the system is also needed.

SUMMARY OF THE INVENTION

Accordingly, a primary object of the present invention is to provide a method for generating an OVSF code for improving the defects in the prior art. In this application, a new tree-structured generation method for obtaining OVSF codes that preserve orthogonality between different rates and SFs based on Gray code labels is presented. With Gray code labeling, to see if a code can be assigned to a user is equivalent to see if there exists any prefix of the Gray code label of this code. Furthermore, by taking advantage of the Gray code labeling, each OVSF code can be generated directly from the generator matrix instead of being generated recursively using a tree structure as in the above listed papers of E. Dinan and B. Jabbari; K. Gilhousen, and F. Adachi, M. Sawahashi, and K. Okawa, and paper of 3GPP TR 25.922 v. 0.5.0, "Radio Resource Management Strategies," October 1999. Finally, an OVSF code reassignment method with Gray code labeling is proposed.

To achieve above objects, the present invention provides a spreading method for use in a CDMA multi-rate systems, comprising the steps of:

A. coding message codes using Gray codes;
B. generating a generating matrix based on formed Gray codes; and
C. multiplying the message coded by the Gray code with the generating matrix for generating an OVSF code with a specific length.

In above spreading method for use in a CDMA multi-rate system, by a digital logic assembly circuit, the message is coded using the Gray codes.

In above spreading method for use in a CDMA multi-rate system, the digital logic assembly circuit is an encoder with a plurality of coefficients, wherein these coefficients are generated through the following matrix:

$$G_i = \begin{bmatrix} C_{2^i}^{(1,0,\ldots,0)}(j_{i-1}) \\ C_{2^i}^{(0,1,0,\ldots,0)}(j_{i-2}) \\ \vdots \\ C_{2^i}^{(0,\ldots,0,1)}(j_0) \end{bmatrix}$$

In the spreading method for use in a CDMA multi-rate system, a multiplying circuit is used and the Gray code is used as an input of the encoder. If extra Gray code label inputs are connected to "0" and extra output bits are discarded, as a consequence, a single encoding circuit is used to generate a short-length OVSF code in the code tree, i.e., the whole OVSF code tree is generated by storing a $G_n$, wherein n is the largest i.

A method for determining a mother code and a children code in a CDMA multi-rate system comprises the steps of:
A. using a plurality of Gray codes as labels of a plurality of OVSF codes; and
B. determining whether a first OVSF code and a second OVSF code has a relation of a mother code and a children code by determining whether a label of the first OVSF code is a prefix of a label of the second OVSF code.

In the method for determining a mother code and a children code in a CDMA multi-rate, each OVSF code has a specific Gray code label, wherein if an OVSF code is 0011, then a respective Gray code label is 01.

In the method for determining a mother code or a children code in a CDMA multi-rate system, the Gray code labels serve to determine whether two OVSF codes have a relation of a mother code and a children code, assuming that the first OVSF code of 0011 has a Gray code label of 01, and the second OVSF code of 00111100 has a Gray code label of 010, and then the first OVSF code of 0011 is a mother code of the second OVSF code of 00111100.

A method for exchanging OVSF codes in a CDMA multi-rate system, comprises the steps of:
A. using a plurality of Gray codes as labels of a plurality of OVSF codes;
B. performing a modulo-2 operation on the Gray code label of the first OVSF code and the Gray code label of the second OVSF code to generate a label of a third OVSF code; and
C. performing a modulo-2 operation on the third OVSF code and the first OVSF code to generate the second OVSF code.

In the method for exchanging OVSF codes in a CDMA multi-rate system, each of the OVSF codes has a specific Gray code label.

In the method for exchanging OVSF codes in a CDMA multi-rate system, wherein a modulo-2 adder is used to generate the OVSF code.

According to the aforesaid concept, the present invention discloses a generating method for Gray codes, tree-structure of OVSF codes and the Gray code labels, a generating matrix for generating OVSF codes and a method for exchanging OVSF codes according to the Gray code labels.

Since a multiple spread spectrum technology is used in the 3G mobile communication structure, while an orthogonal spread spectrum is used in the initial step of the multiple spread spectrum, a multimedia transmission can be achieved by OVSF codes with variable lengths. Therefore, it is predicted that the present invention may improve the application of the high frequency communication system in a wireless communication, especially in the 3G mobile communication.

The various objects and advantages of the present invention will be more readily understood from the following detailed description when read in conjunction with the appended drawings.

BRIEF DESCRIPTION OF THE DRAWINGS AND TABLE

Table 1 is a list of four-bit Gray codes.

DETAILED DESCRIPTION OF THE PREFERRED EMBODIMENTS

In order that those skilled in the art can further understand the present invention, the present invention will be described hereinafter in detail. However, the descriptions and the appended drawings are only used to enable those skilled in the art to understand the objects, features, and characteristics of the present invention, but not to be used to limit the scope and spirit of the present invention defined in the appended claims.

1. Generation of Gray Codes

The assignment of k information bits to the $2^k$ distinct elements may be done in a number of ways. A preferred assignment of the present invention is one in which only one bit in a code group changes when going from one number to the next. This assignment is called Gray coding (refer to M. Mano, Digital Design, 2nd Ed., Prentice-Hall, 1998; and J. Proakis, Digital Communications, 3rd Ed., McGraw-Hill, 1995). Table 1 shows four-bit Gray codes, along with the corresponding binary numbers. For example, in going from decimal 3 to decimal 4, the Gray code changes from 0010 to 0110, while the binary code changes from 0011 to 0100. Compared with binary codes, every number differs by only 1 bit from its preceding number in the entire Gray codes.

Figure 1:
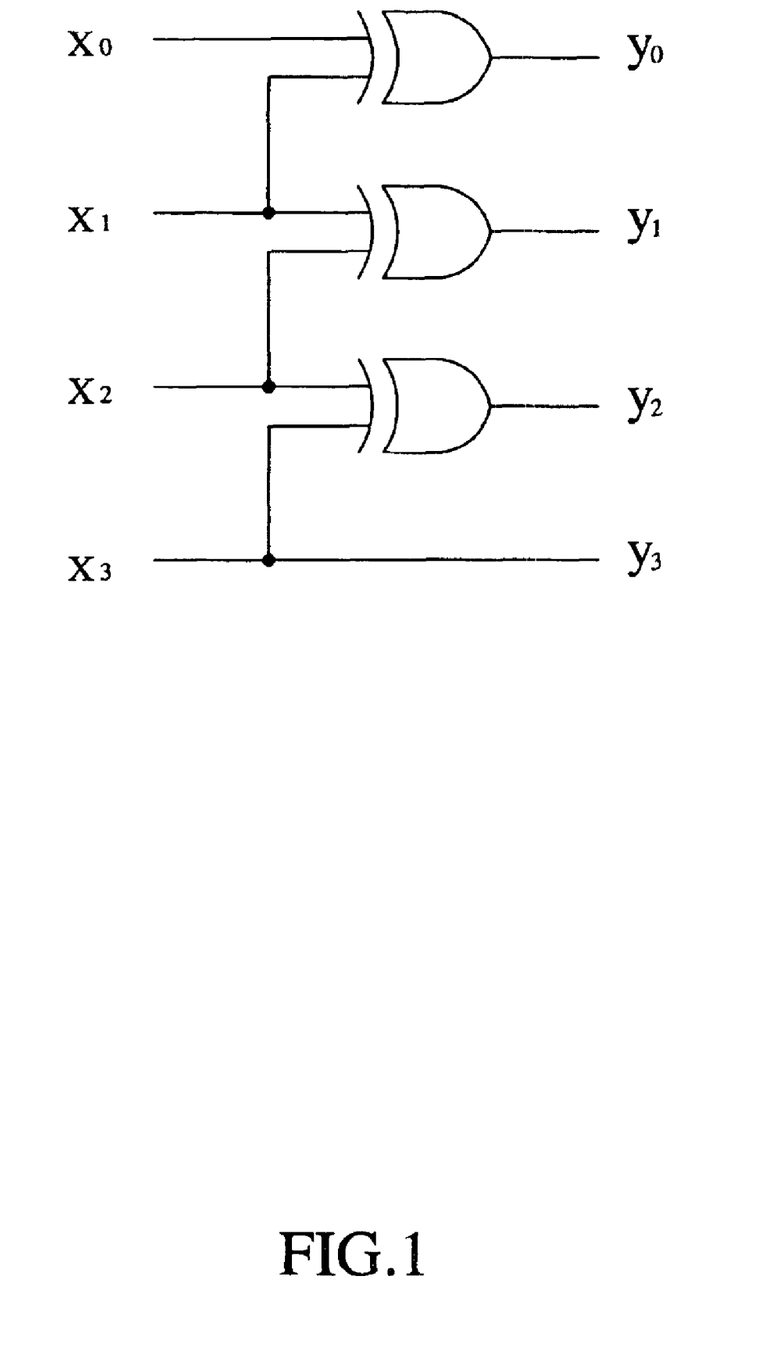
FIG. 1 shows a four-bit binary-code-to-Gray-code converter.

To convert from a binary code to a Gray code, a combinational circuit performs this conversion by means of logic gates is shown in FIG. 1. The four input binary variables are designated by the symbols $x_0$, $x_1$, $x_2$ and $X_3$, and the four output binary variables are designated by $y_0$, $y_1$, $y_2$ and $y_3$. Note that output $y_3$ is always equal to input $x_3$. The other three outputs of the combinational circuit are equal to $$y_i = x_{i+1} \oplus x_i \text{ for } i=0, 1, 2 \quad (1)$$

where "$\oplus$" denotes an exclusive-OR (XOR) operation and is given by $$w \oplus z = wz' + w'z \quad (2)$$

The result is equal to 1 if only w is equal to 1 or if only z is 1 but not both (refer to M. Mano, Digital Design, 2nd Ed., Prentice-Hall, 1998). In general, the binary code with n input variables can be converted into the Gray code by means of $$y_{n-1} = x_{n-1}$$
$$y_i = x_{i+1} \oplus x_i \text{ for } i=0, 1, \ldots, n-2 \quad (3)$$

To convert in the opposite direction, from Gray code to binary code, use the relation given as follows:

$$x_{n-1} = y_{n-1} \quad (4)$$

$$x_i = x_{i+1} \oplus y_i \text{ for } i = 0, 1, \ldots, n-2$$

$$= y_{n-1} \oplus y_{n-2} \ldots \oplus y_i \text{ for } i = 0, 1, \ldots, n-2$$

2. OVSF Code with Gray Code Labeling

Figure 2:
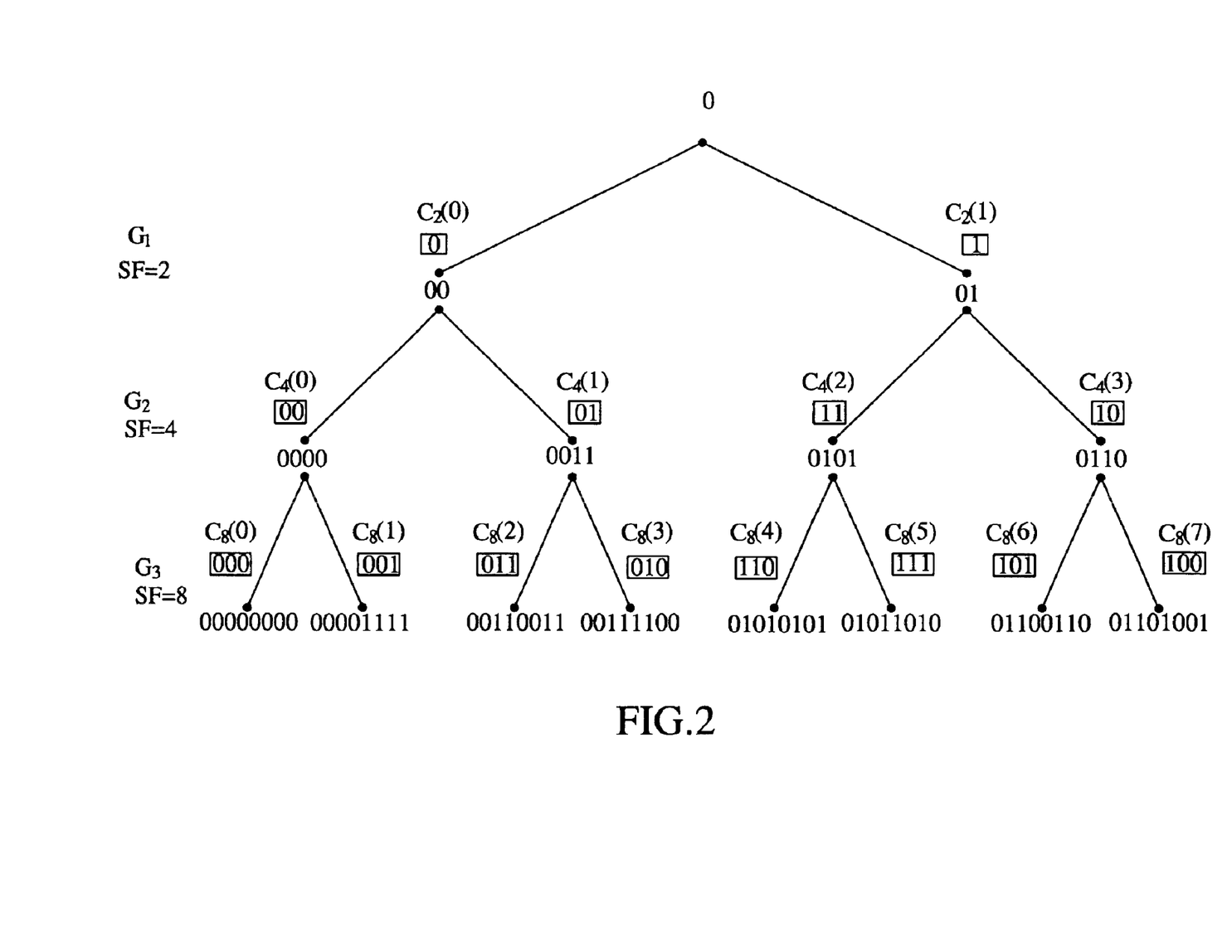
FIG. 2 shows an OVSF code tree with Gray code labeling.

The tree-structure of OVSF codes that preserve orthogonality between different rates and SFs is shown in FIG. 2 (refer to the above listed papers of E. Dinan and B. Jabbari; K. Gilhousen, and F. Adachi, M. Sawahashi, and K. Okawa and paper of 3GPP TR 25.922 v. 0.5.0, "Radio Resource Management Strategies," October 1999). In FIG. 2, the OVSF codes are denoted by $C_{SF}(i)$, where SF is a spreading factor of the code, i is a code number, and $0 \leq k \leq SF-1$. Each level in the code tree defines OVSF codes of the length SF. Therefore, there are $2^i$ spreading codes with the length of $2^i$ at the ith layer. Let $C_N$ be a matrix of dimension $N \times N = 2^i$) and denote the set of N binary (0,1) spreading codes of length N at the ith layer, $\{C_N(i): i=0, \ldots, N-1\}$. Then $C_N$ can be generated from $CN_{N/2}$ according to the relation in the above listed papers of E. Dinan and F. Adachi, M. Sawahashi, and K. Okawa, and paper of 3GPP TR 25.922 v. 0.5.0, "Radio Resource Management Strategies," October 1999.

$$C_N = \begin{bmatrix} C_N(0) \\ C_N(1) \\ C_N(2) \\ C_N(3) \\ \vdots \\ C_N(N-2) \\ C_N(N-1) \end{bmatrix} = \begin{bmatrix} C_{N/2}(0)C_{N/2}(0) \\ C_{N/2}(0)\overline{C_{N/2}(0)} \\ C_{N/2}(1)C_{N/2}(1) \\ C_{N/2}(1)\overline{C_{N/2}(1)} \\ \vdots \\ C_{N/2}(N/2-1)C_{N/2}(N/2-1) \\ C_{N/2}(N/2-1)\overline{C_{N/2}(N/2-1)} \end{bmatrix} \quad (5)$$

Where $\overline{CN_{N/2}(k)}$ is the binary complement (i.e. 0s are replaced by 1s and vice versa) of $C_{N/2}(k)$. By repetitive application of Equation (5), these OVSF codes can be generated recursively using a tree structure as shown in FIG. 2.

The $2^i$ codes at the ith layers constitute a set of Walsh codes of order $2^i$. Therefore, any two codes at the same layer in the code tree are orthogonal. Furthermore, any two codes at different layers are also orthogonal except for the case that one of the two codes is a mother code of the other (refer to above listed papers of E. Dinan and B. Jabbari; K. Gilhousen, and F. Adachi, M. Sawahashi, and K. Okawa and paper of 3GPP TR 25.922 v. 0.5.0, "Radio Resource Management Strategies," October 1999). A code is a mother code of the other code if this code is on the path from the other code to the root of the code tree and a code is a children code of the other code if this code is in the sub-tree below the other code. For example, as shown in FIG. 2, $C_2(0)$ and $C_4(1)$ are mother codes of $C_8(3)$ and $C_2(0)$ is a mother code of $C_4(1)$, while $C_4(1)$ and $C_8(3)$ are children codes of $C_2(0)$ and $C_8(3)$ is a children code of $C_4(1)$. Therefore, $C_2(0)$, $C_4(1)$ and $C_8(3)$ are not orthogonal. In order to maintain orthogonality, a code can be assigned to a user if and only if no mother code of this specific code or children code of this specific code is used. Therefore, an assignment of large SF codes low data rate users may preclude a large number of small SF codes. This means that the number of available codes that could be used by other users depends on not only the codes which are assigned in the code tree but also the mother and children codes of these assigned codes.

However, the code tree is huge as any of channelization codes can use SF from 4 to 256 in IMT-2000. An efficient method for deciding if the code is the mother code or children code of the other code without searching the entire code tree is needed.

With Gray code labeling OVSF codes as shown in FIG. 2, to decide if a code is a mother code of the other code or not is equivalent to checking if the label of a code is or is not a prefix of the label of the other code. Each OVSF code is uniquely associated with a Gray code label. A code can be assigned to a user if and only if its Gray code label is not a prefix of the Gray code labels of the other codes or the Gray code label of the other code is not a prefix of its Gray code label. In the following section, we show that the Gray code labels are not only useful in identifying the mother codes or children codes of a code but also can be used to generate the OVSF codes directly without using the recursive generation method as described in equation (5).

3. Generation of OVSF Codes

Let an (N,K) block code denote a set of $2^K$ codewords of length N. Then the $2^i$ codes at the ith layer of OVSF codes is a $(2^i, i)$ linear code. Since any (N,K) linear code can be generated by a $K \times \times$ generator matrix G (refer to S. Lin and D. Costello, Jr., Error Control Coding: Fundamentals and Applications, Prentice-Hall, 1983). Therefore, $C_{2^i}^f(j)(j \in \{0, 2^i-1\})$ at the ith layer of OVSF codes can be derived as follows:

$$C_{2^i}^f(j) = f \cdot G_i \quad (6)$$

where $C_{2^i}^f(j)$ is $C_{2^i}(j)$ with Gray code label f, $f=(f_{i-1}, f_{i-2}, \ldots, f_0)$ is the Gray codes the massage encoded by, and $G_i$ is the $i \times 2^i$ generator matrix at the ith layer of the code tree and is given as follows:

$$G_i = \begin{bmatrix} C_{2^i}^{(1,0,\ldots,0)}(j_{i-1}) \\ C_{2^i}^{(0,1,0,\ldots,0)}(j_{i-2}) \\ \vdots \\ C_{2^i}^{(0,\ldots,0,1)}(j_0) \end{bmatrix} \quad (7)$$

$G_i$ can also be generated from $G_{i-1}$ as given by $$G_i = \begin{bmatrix} G_{i-1} & \overline{G_{i-1}} \\ 0_{2^{i-1}} & 1_{2^{i-1}} \end{bmatrix} \quad (8)$$

where $\overline{G_{i-1}}$ is the binary complement of $G_{i-1}$, and $0_{2^{i-1}}=(0, 0, \ldots, 0)$ and $1_{2^{i-1}}=(1, 1, \ldots, 1)$ are all-zero vector and all-one vector of $2^{i-1}$ elements, respectively.

As a result, $G_i$ can be generated recursively using $G_i$. Thus, $$G_i = [0 \ 1] \quad (9)$$

$$G_2 = \begin{bmatrix} G_1 & \overline{G_1} \\ 0_2 & 1_2 \end{bmatrix} = \begin{bmatrix} 0 & 1 & 1 & 0 \\ 0 & 0 & 1 & 1 \end{bmatrix} \quad (10)$$

and $$G_3 = \begin{bmatrix} G_2 & \overline{G_2} \\ 0_4 & 1_4 \end{bmatrix} = \begin{bmatrix} 0110 & 1001 \\ 0011 & 1100 \\ 0000 & 1111 \end{bmatrix} \quad (11)$$

Figure 3:
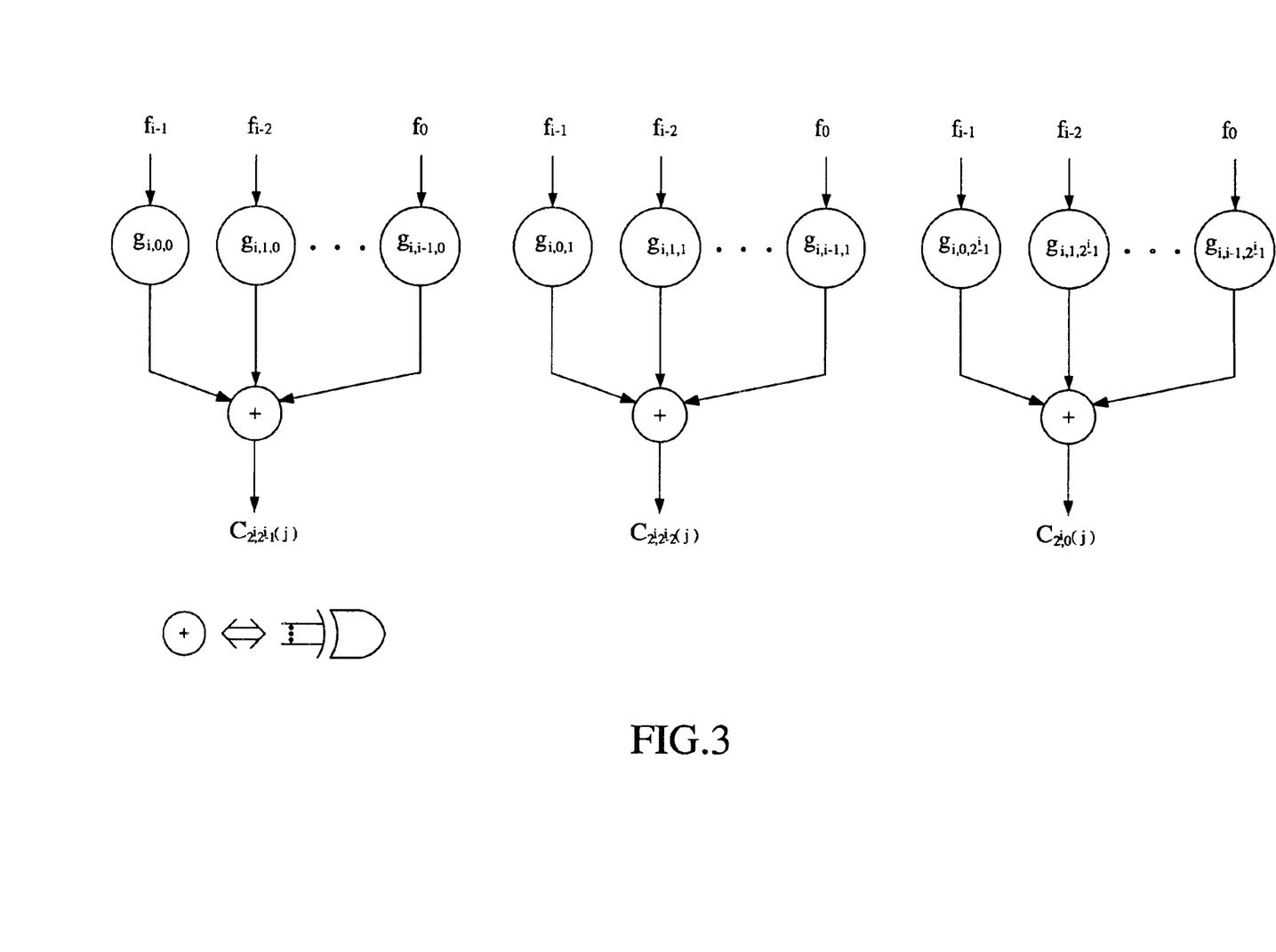
FIG. 3 is an encoding circuit for generating OVSF codes.

Based on equation (6), an encoding circuit is shown in FIG. 3. In this circuit, "→O→" represents a connection if $g_{i,l,m}=1$ and no connection if $g_{i,l,m}=0$, and "⊕" represents a modulo-2 adder. $f=(f_{i-1}, f_{i-2}, \ldots, f_0)$ is the message encoded by the Gray codes, $C_{2^i}(j)=(C_{2^i,2^i-1}(j), \ldots, C_{2^i,0}(j))$ is the corresponding code, and $$G_i = \begin{bmatrix} g_{i,0,0} & g_{i,1,0} & \cdots & g_{i,i-1,0} \\ g_{i,0,1} & g_{i,1,1} & \cdots & g_{i,i-1,1} \\ \vdots & \vdots & \cdots & \vdots \\ \vdots & \vdots & \cdots & \vdots \\ g_{i,0,2^i-1} & g_{i,1,2^i-1} & \cdots & g_{i,i-1,2^i-1} \end{bmatrix} \quad (12)$$

is the generator matrix as specified by equation (7).

It is worth noting that $C_{2^k}(j)(k \in \{1,i-1\})$ can be implemented with the circuit of FIG. 3 if extra Gray code label inputs are connected to "0" and extra output bits are discarded. As a consequence, a single encoding circuit can be used to generate any OVSF code in the code tree, resulting in the great saving on the hardware cost. Furthermore, a base station can transmit the assigned OVSF code to a mobile phone with only its Gray code label instead of the entire OVSF code, which greatly reduces the transmission time. For example, the base station just only needs to transmit 8 bits for an OVSF code with SF 8 and length 256.

4. OVSF Code Reassignment

A proper code allocation algorithm is to support as many users as possible with less complexity. Usually, the number of codes to support the multi-code capability in each mobile station is limited. Therefore, the assignment of the codes with small SFs to the high data rate users would be preferred. However, a random assignment of codes to low data rate users with large SF may preclude the assignment of the codes with small SFs, which may limit the number of remaining OVSF codes that could be used by other users. Accordingly, it will be advantageous to reassign the OVSF codes to active low data rate users in some ways so as to minimize the number of disqualified OVSF codes with small SFs. In this section, we propose a method for reassigning a new OVSF code to an active user.

Let $C_{2^i}^{f_1}(j_1)$ be an original OVSF code assigned to an active user and $C_{2^i}^{f_2}(j_2)$ be a new OVSF code reassigned to the active user. To maintain service for current transmission while doing the reassignment, the new OVSF code $C_{2^i}^{f_2}(j_2)$ is obtained by adding an OVSF code $C_{2^i}^{f_3}(j_3)$ to the original OVSF code $C_{2^i}^{f_1}(j_1)$ and is given by $$C_{2^i}^{f_2}(j_2)=C_{2^i}^{f_1}(j_1) \oplus C_{2^i}^{f_3}(j_3) \quad (13)$$

where $C_{2^i}^{f_3}(j_3)$ is a transitional OVSF code and is obtained by applying its Gray code label to equation (6). The Gray code label of $C_{2^i}^{f_3}(j_3)$ is given by $$f_3=f_1 \oplus f_2 \quad (14)$$

Figure 4:
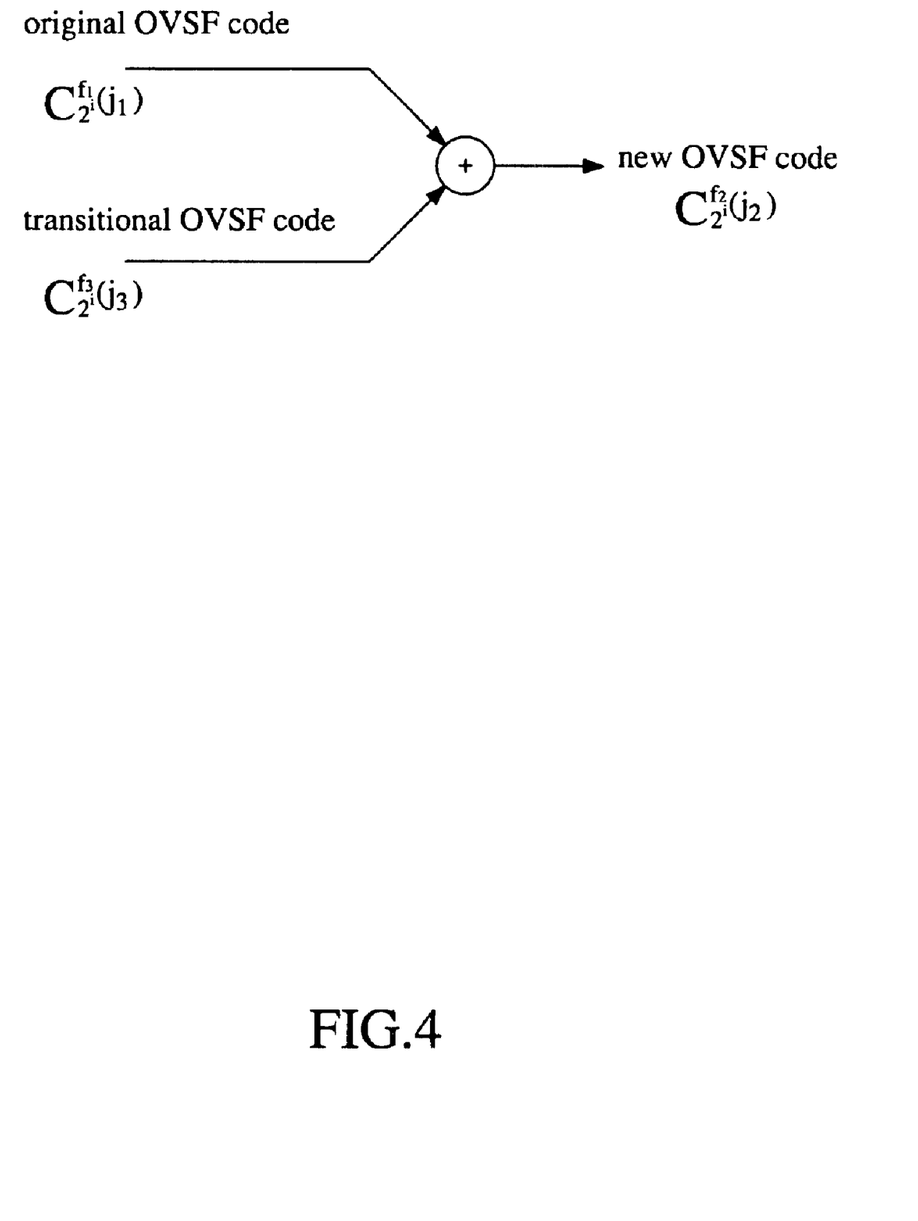
FIG. 4 shows a circuit for reassigning OVSF codes.

This is because that Walsh code is a linear code. AS a consequence, the modulo-2 sum of two OVSF codes with the same SF is also an OVSF code. The circuit for reassigning of OVSF codes is shown in FIG. 4.

5. Conclusions

In this invention, a new tree-structured generation method for obtaining OVSF codes that preserve orthogonality between different rates and SF based on Gray code labels in a CDMA system is introduced. We have shown that the Gray code labels are not only useful in identifying the mother codes or children codes of a code but also can be used to generate the OVSF codes directly without using the recursive generation method. Moreover, we have proposed an OVSF code reassignment method based on Gray code labeling.

The present invention are clearly described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A spreading method for use in a CDMA (Code Division Multiple Access) multi-rate system, comprising the steps of:
   (A) coding message codes using Gray codes;
   (B) generating a generating matrix, $G_i$, based on formed Gray codes; and
   (C) multiplying the message coded by the Gray codes with the generating matrix for generating an OVSF (Orthogonal Variable Spreading Factor) codes with a specific length.

2. The spreading method for use in a CDMA multi-rate system as claimed in claim 1, wherein said message is coded by a digital logic assembly circuit.

3. The spreading method for use in a CDMA multi-rate system as claimed in claim 2, wherein said digital logic assembly circuit is an encoder with a plurality of coefficients, and these coefficients are generated through the following matrix:

$$G_i = \begin{bmatrix} C_{2^i}^{(1,0,\ldots,0)}(j_{i-1}) \\ C_{2^i}^{(0,1,0,\ldots,0)}(j_{i-2}) \\ \vdots \\ C_{2^i}^{(0,\ldots,0,1)}(j_0) \end{bmatrix}.$$

4. The spreading method for use in a CDMA multi-rate system as claimed in claim 1, further comprising the step of employing a multiplying circuit and said Gray codes are used as inputs of the encoder.

5. The spreading method for use in a CDMA multi-rate system as claimed in claim 1, wherein if extra Gray code label inputs are connected to "0" and extra output bits are discarded, a single encoding circuit is used to generate a short-length OVSF code in the code tree, thereby generating a whole OVSF code tree by storing a $G_n$, wherein n is the largest i.

6. A method for determining a mother code and a children code in a CDMA (Code Division Multiple Access) multi-rate system, comprising the steps of:
   (A) using a plurality of Gray codes as labels of a plurality of OVSF (Orthogonal Variable Spreading Factor) codes; and
   (B) determining whether a first OVSF code and a second OVSF code have a relation of a mother code and a children code by determining whether a label of said first OVSF code is a prefix of a label of said second OVSF code.

7. The method for determining a mother code and a children code in a CDMA multi-rate system as claimed in claim 6, wherein each OVSF code has a specific Gray code label, and wherein if an OVSF code is 0011, then a respective Gray code label is 01.

8. The method for determining a mother code or a children code in a CDMA multi-rate system as claimed in claim 6, wherein said Gray code labels serve to determine whether two OVSF codes have a relation of a mother code to a children code, assuming that said first OVSF code of 0011 has a Gray code label of 01, and said second OVSF code of 00111100 has a Gray code label of 010, and then said first OVSF code of 0011 is a mother code of said second OVSF code of 00111100.

9. A method for exchanging OVSF (Orthogonal Variable Spreading Factor) codes in a CDMA (Code Division Multiple Access) multi-rate system, comprising the steps of:

(A) using a plurality of Gray codes as labels of a plurality of OVSF codes;

(B) performing a modulo-2 operation on the Gray code label of a first OVSF code and the Gray code label of a second OVSF code for generating a label of a third OVSF code; and (C) performing a modulo-2 operation on said third OVSF code and said first OVSF code for generating said second OVSF code.

10. The method for exchanging OVSF codes in a CDMA multi-rate system as claimed in claim 9, wherein each of said OVSF codes has a specific Gray code label.

11. The method for exchanging OVSF codes in a CDMA multi-rate system as claimed in claim 9, furthering comprising the step of employing a modulo-2 adder to generate said OVSF codes.

* * * * *